United States Patent [19]

Cunningham

[11] 4,236,340

[45] Dec. 2, 1980

[54] FISHING ROD INDICATOR ASSEMBLY

[76] Inventor: James C. Cunningham, 2413 W. 25th St. Dr., Topeka, Kans. 66611

[21] Appl. No.: 47,567

[22] Filed: Jun. 11, 1979

[51] Int. Cl.³ .................................................. A01K 97/12
[52] U.S. Cl. ........................................................ 43/17
[58] Field of Search ...................................... 43/17, 25

[56] References Cited

U.S. PATENT DOCUMENTS

| 3,012,352 | 12/1961 | Logsdon | 43/17 |
|---|---|---|---|
| 3,143,822 | 8/1964 | Schooley | 43/17 |
| 4,125,957 | 11/1978 | Cunningham | 43/17 |
| 4,146,988 | 4/1979 | Bednarczyk | 43/17 |

FOREIGN PATENT DOCUMENTS

| 1412953 | 11/1975 | United Kingdom | 43/17 |
|---|---|---|---|
| 1509331 | 5/1978 | United Kingdom | 43/17 |

*Primary Examiner*—Nicholas P. Godici

*Attorney, Agent, or Firm*—Schmidt, Johnson, Hovey & Williams

[57] ABSTRACT

An indicator assembly for attachment to a fishing rod, which assembly gives a positive, visual indication of a fish bite. The assembly, which may be semi-permanently or permanently mounted on a standard fishing rod, does not in its first, stored position, interfere with the normal use of the rod, being mounted thereon by means which permit conventional use of the rod. The assembly may be placed into use by merely unhooking a weight, which is carried by the mounting means and through which the fishing line is trained, permitting the weight to move, by gravity, from its first position, to a second, use position, spaced from the rod and whereby a portion of the fishing line is drawn away from the rod, the weight, in said second position, being shiftable in response to the bite of a fish on the line, to thereby visually signal said bite.

8 Claims, 5 Drawing Figures

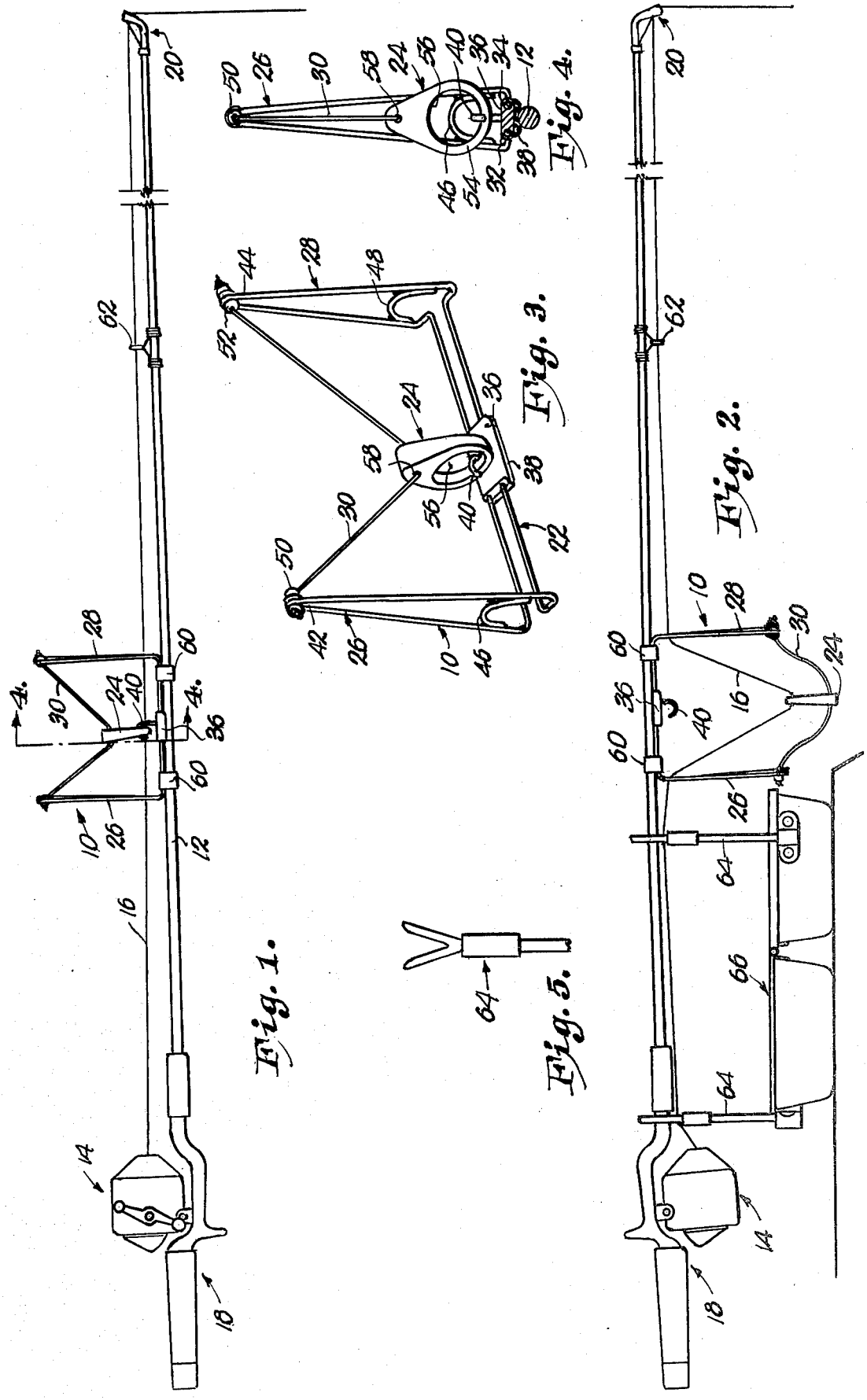

FISHING ROD INDICATOR ASSEMBLY

BACKGROUND ART

This invention relates to an assembly for attachment to a conventional fishing rod and wherein there is support structure permanently or semi-permanently mounted on the rod, which support structure carries a weight, the fishing line being trained through an opening in the weight, the weight being movable from a first, stored position to a second position of use and wherein the weight draws the fishing line away from the rod in such a manner that a bite on the end of the line will cause shifting movement of the weight to visually indicate the presence of a bite on the line.

This invention is an improvement over my U.S. Pat. No. 4,125,957 issued Nov. 21, 1978 and which relates generally to the same subject matter.

However, the present assembly is much simpler in construction and operation and presents a unit wherein the fishing line and the means holding the weight on the fishing pole are relatively free from the possibility of becoming entangled. Further, the mounting means by which the assembly is attached to the fishing pole also provides, at the same general area, the hook for retaining the weight in its stored, non-use position and it is not necessary to hook the weight to the pole at a position distant from its normal point of use in order to store the weight.

Another important difference is that the fishing line is, at all times, trained through the opening in the weight; however, such does not prevent conventional use of the fishing pole, such as by casting the same or the like, and it is not necessary to train the fishing line through the weight after the pole has been cast; that is, subsequent to the placing, in the body of water, the lure or plug as was the case with the invention disclosed in my said previous Pat. No. 4,125,957.

As indicated in said earlier patent, others have been aware for some time of the problem of detecting a fish bite, as evidenced for instance, by the disclosures in U.S. Pat. Nos. 3,023,532; 3,143,822; and 3,916,554, which disclose various types of apparatus adapted to be used with a rod and a line combination for indicating the existence of a bite on the line. Each of the devices in the above noted prior art patents is sensitive to the application of tension on the line which occurs when a fish moves the bait in a direction away from the rod and function to produce a visual signal when a prescribed tension has been imposed on the line. However, as previously indicated, these prior art devices are less than completely satisfactory since line tension produced by waves or wind can give rise to faulty indications of bite; moreover, none of these previous indicators is operative to signal a bite when the fish is taking and moving the bait in a direction toward the rod.

The present invention, for the reasons hereinabove set forth, overcomes the above mentioned deficiencies in that it provides a readily visible weight which is carried by mounting means intermediate the ends of a conventional fishing pole and which weight has trained, through an opening therein, the fishing line, the weight being shiftable from a stored, first position, adjacent the fishing rod to a second, gravity-induced position spaced from the rod.

In the position of use, the weight draws the fishing line away from the rod in such a manner that, when there is any pull or other action on the end of the fishing line normally carrying the bait, the weight will move whereby to give the user a visual indication that there is a bite on the end of the line.

Thus, a primary object of the invention is to provide a fishing rod indicator assembly which is readily mounted upon a fishing rod and which may be used to visually indicate the presence of a bite on the line.

Yet another object is to provide an indicator assembly which is readily visible, by means of a shiftable weight, the weight being shiftable by action of the fishing line, which fishing line is trained through an opening in the weight at all times.

Yet another object is to provide an assembly wherein the weight may be readily moved to a storage position when it is not desired to use the same but may likewise be readily moved to a position of use when it is desired to place the same in an operative position, all without removing the fishing line from the opening provided therefor in the weight.

Other objects of the invention will become apparent from the following specification and accompanying drawing.

BRIEF DESCRIPTION OF THE DRAWINGS

In the drawings:

FIG. 1 is a side elevational view of a fishing rod and line with the fishing rod indicator assembly mounted on the rod, the assembly being shown in its first, stored position;

FIG. 2 is a side elevational view of a fishing rod and line combination shown in an operative condition and wherein the weight carried by the indicator assembly is in its second, operative position spaced from the rod;

FIG. 3 is an enlarged perspective view of the fishing rod indicator assembly;

FIG. 4 is a sectional view taken on line 4—4 of FIG. 1; and

FIG. 5 is a fragmentary, elevational view, of the means which might be used to support the rod in the position shown in FIG. 2 of the drawing and, as illustrated.

DETAILED DESCRIPTION

The fishing rod indicator assembly is broadly designated by the numeral 10 and is intended to be mounted upon a conventional fishing rod 12, which rod 12 normally carries a reel 14 and a fishing line 16.

The indicator assembly 10 is intended to be mounted on the rod 12 between the butt end 18 and the tip end 20 thereof.

Indicator assembly 10 includes, as its primary components, support structure, broadly designated as 22 for mounting the assembly 10 on the rod 12; a weight 24; a pair of spaced arms 26 and 28 and a length of flexible material 30 mounting the weight 24 between said arms 26 and 28, as illustrated.

Specifically, the support structure 22 includes a pair of spaced apart wires 32 and 34 adapted to generally straddle the fishing pole 12 and carrying, intermediate the ends thereof a plate 36 which, on the face thereof adjacent rod 12 is provided with a cushion 38 and, on the face thereof spaced from rod 12 is provided with a hook 40.

The spaced wires 32 and 34 which serve to define the support structure 22 then extend outwardly, being bent as illustrated, whereby to present the arms 26 and 28, which are in the nature of standoffs; that is, the inner ends of the arms 26 and 28, respectively, are generally adjacent the rod 12 whereas the outer ends 42 and 44 of arms 26 and 28, respectively, are spaced a distance from the rod 12 and also, of course, from support structure 22.

Forming a part of each of the arms 26 and 28 are keepers 46 and 48 which are generally U-shaped and have the bight portion thereof spaced from the rod 12 and the open end thereof generally adjacent the rod 12 so that the fishing line 16 may be trained through the keepers and the line restrained by the bight portions of said keepers 46 and 48.

The weight 24, as indicated, is carried by the arms 26 and 28 by means of a flexible tether 30. The free ends of the flexible tether are secured, by swivel mountings 50 and 52, respectively, to the outer ends 42 and 44 of arms 26 and 28 whereby the weight 24 may be moved from a first position to a second position.

FIGS. 1 and 3 of the drawing show the weight 24 in its first or stored position. In said position, the weight is retained with respect to the rod or pole 12 by means of the hook 40, which hook engages a rim 54 which is defined by an opening 56 which is formed through the weight 24.

The body portion of weight 24 is also provided with an aperture 58 through which the flexible line 30 is trained.

It will be appreciated that, with the weight 24 in the first position as illustrated in FIG. 3, the assembly 10 may be readily and quickly mounted upon the fishing rod 12 as by bringing cushion 38 into engagement with the upper surface of the rod 12 as illustrated, for instance, in FIG. 1, and then securing the assembly 10 to the rod by means of tape or clamps such as 60 which are placed over the wires 32 and 34 and around the rod 12 whereby to clamp or bind the assembly 10 to the fishing rod and in the position shown in FIG. 1 of the drawing.

It should be noted that, either prior to or subsequent to the mounting of the assembly 10 on the rod, it is appropriate to train fishing line 16 through the opening 56 so that the line 16 will thereafter always be retained within the opening 56 for purposes which will hereinafter become apparent.

In its first or stored position, the assembly does not interfere with the conventional use of the fishing rod 12 and line 16 inasmuch as the line and the lure or other bait which might be attached to the free end thereof may be readily cast and the line 16 will operate in its normal manner, being retained in spaced, generally parallel relationship to the rod 12 by means of keepers 46 and 48 and the opening 56 in weight 24. Thus, keepers 46 and 48 and opening 56 serve as further eyes through which the line passes, and are comparable to the conventional eye such as 62 which is normally found on a fishing rod and through which the line is trained.

However, once the line has been cast and it is desired to position the assembly 10 in such a manner as to function in its intended fashion, the assembly may be inverted to the position shown in FIG. 2 of the drawing and the weight 24 detached from its first position held by hook 40.

When in this position, the weight 24 draws the line 16 away from the rod 12 to the position shown in FIG. 2 and wherein there is a tension exerted on the line 16 by virtue of the presence of the weight 24. Weight 24 is generally retained in a movable or shiftable position by means of the flexible, resilient tether 30.

Further, the pole may be suitably supported by means of standards 64 which are generally Y-shaped, as illustrated in FIG. 5, and which may be suitably mounted upon a tackle box such as 66 or, if desired, may be pushed into the ground to then receive the rod 12 and associated components as illustrated in FIG. 2.

When the assembly 10 is in the position of use; that is, the second position as illustrated in FIG. 2, any movement on the line 16 will cause a shifting movement of the weight 24 and thereby give a visual indication to the user that there is a bite on the line. It is preferable that the weight 24 be made of a brightly colored material so that any relative movement thereof will be instantly noticeable whereupon the appropriate action may be taken.

It should be noted that, if the rod and line are retained in the position shown in FIG. 2 and the line reeled in, the weight 24 will still not interfere with the normal use of the line but will merely be drawn upwardly, viewing FIG. 2, and the opening 56 will then be moved into alignment with keepers 46 and 46 whereby to permit smooth reeling in of the line.

When it is not desired to utilize the advantages of assembly 10, it will be appreciated that the rim 54 of weight 24 may be hooked over the hook 40 carried by plate 36 and the opening 56 of the weight thereby serves as a further "eye" for the line in its conventional use and cooperates with keepers 46 and 48 and eyes or loops such as 62 in order to retain the line 16 in the desired position with respect to the rod 12 for conventional use.

However, when it is desired to utilize the advantages of assembly 10, the weight 24 may be readily released from its first position, as illustrated in FIGS. 1 and 3 and will, by weight of gravity, move to the second position, as illustrated in FIG. 2 whereby to draw a tension on the fishing line 16 and thus be ready to immediately indicate any movement of the line resulting from a bite.

I claim:

1. A fishing rod indicator assembly adapted for use with an elongated fishing rod having a fishing line trained along the length thereof and a baited hook on said line, said assembly comprising:

support structure for mounting onto said rod intermediate the ends thereof and including at least one elongated mounting arm extending generally transversely of said rod;

a weight;

means mounting said weight on said arm for allowing shiftable movement of the weight between a first position adjacent said rod and a second, gravity-induced position spaced from the rod; and means for releasably locking said weight in said first position, said weight including line-engaging means for drawing a portion of said fishing line away from said rod when said weight is in said second position thereof, said weight, in said second position thereof and in engagement with said drawn portion of said fishing line, being shiftable towards said rod in response to the bite of a fish on said baited hook for signaling the existence of said bite.

2. The assembly as set forth in claim 1 wherein said line-engaging means comprises structure defining a line-passing opening through said weight.

3. A fishing rod indicator assembly adapted for use with an elongated fishing rod having a fishing line trained along the length thereof and a baited hook on said line, said assembly comprising:

support structure for mounting onto said rod intermediate the ends thereof, said support structure including a pair of spaced mounting arms extending in the same general direction from said rod;

a weight mounted between said arms;

means mounting said weight on said arms for allowing shiftable movement of the weight between a first position adjacent said rod and a second, gravity-induced position spaced from the rod, said weight including line-engaging means for drawing a portion of said fishing line away from said rod when said weight is in said second position thereof, said weight, in said second position thereof and in engagement with said drawn portion of said fishing line, being shiftable towards said rod in response to the bite of a fish on said baited hook for signaling the existence of said bite.

4. The assembly as set forth in claim 3 wherein said support structure comprises an elongated, rod-engaging base, said mounting arms being secured to opposed ends of said base.

5. The assembly as set forth in claim 3 wherein said weight-mounting means comprises a length of flexible material secured between said mounting arms and supporting said weight.

6. The assembly as set forth in claim 5 wherein said flexible material comprises a resilient stretch of line.

7. The assembly as set forth in claim 5 wherein said material is mounted to said arms for swiveling movement of the material.

8. The assembly as set forth in claim 1 including means for securing said support structure to said rod.

* * * * *